United States Patent [19]

Miller

[11] 4,188,908
[45] Feb. 19, 1980

[54] NOVEL MICROSCOPE SLIDE SMOKER

[75] Inventor: Robert A. Miller, Bel Air, Md.

[73] Assignee: The United States of America as represented by the Secretary of the Army, Washington, D.C.

[21] Appl. No.: 3,149

[22] Filed: Jan. 15, 1979

[51] Int. Cl.² .................. B05C 19/02; C23C 11/00
[52] U.S. Cl. .................... 118/715; 118/720; 118/728; 427/124; 427/166; 427/250; 427/282; 427/287
[58] Field of Search ............ 118/720, 728, 715; 427/124, 126, 166, 225, 226, 250, 282, 287

[56] References Cited
U.S. PATENT DOCUMENTS

| 2,160,981 | 6/1939 | O'Brien | 427/250 |
| 2,799,600 | 7/1957 | Scott | 427/124 X |
| 2,908,595 | 10/1959 | Kohl | 427/124 |
| 3,912,829 | 10/1975 | Takahashi et al. | 118/720 X |
| 3,914,515 | 10/1975 | Kane et al. | 427/166 X |
| 4,123,244 | 10/1978 | Leclercq | 118/720 X |

Primary Examiner—Edward C. Kimlin
Attorney, Agent, or Firm—Nathan Edelberg; Robert P. Gibson; Kenneth P. Van Wyck

[57] ABSTRACT

A microscope slide smoker device for providing a layer of smoke reactant to a laboratory microscope slide comprising a base section having a flat upper surface with a rectangular aperture therein, fixture means mounted on said base at the shorter ends of said aperture for holding, aligning and smoking a microscope slide, slide rails mounted on the bottom of said base for receiving a burner screen holder and a hollow chimney tube section which is placed on the top surface of the base section.

4 Claims, 2 Drawing Figures

NOVEL MICROSCOPE SLIDE SMOKER

DEDICATORY CLAUSE

The invention described herein may be manufactured, used, and licensed by or for the Government for governmental purposes without the payment to me of any royalty thereon.

BACKGROUND OF THE INVENTION

The invention relates to a novel smoker device for providing a layer of smoke reactant on a laboratory microscope slide.

The invention further relates to a device for safely burning a magnesium ribbon to provide a magnesium oxide layer on a microscope slide for measuring airborne droplets.

Under the prior art procedure, the magnesium oxide layers are formed on a microscope slide by moving a burning magnesium ribbon, held by forceps, back and forth under the slide at distance such that the tip of the flame just clears the glass when viewed through welder's goggles. The ends and edges of the smoke layer are then scraped to facilitate handling a detailed discussion of the preparation of magnesium oxide smoked slides and their use in detecting and measuring airborne droplets is disclosed in K. R. May, The Measurement of Airborne Droplets by the Magnesium Oxide Method, Journal Scientific Instrumentation, Vol. 27, pp. 128–130 (1950).

The prior art process of a magnesium oxide smoked slide suffered from a number of disadvantages. The burning magnesium ribbon had to be hand held and maneuvered under a glass slide, thus resulting in a hazardous burn problem to personnel and adjacent equipment due to the molten nature of the burning magnesium. The intense light given off by burning magnesium also presents a danger of serious eye damage. Though this problem can be minimized by wearing dark welder's goggles and closing of the area from unprotected personnel, the welder's goggles limit the visibility of the burner flame used to ignite the ribbon and thus create a serious burn hazard to the operator from the burner flame. Under the prior method, a uniform coating was difficult to obtain since two separate six inch pieces of magnesium ribbon had to be passed to and fro under the slide at a constant distance under the slide. As the ribbons burn, they must be raised to compensate for shortening due to burning. Any air current disturbances around the slides require an offsetting movement by the operator to compensate. The rejection rate for slides has thus run approximately 10% under a fume hood and 25% when the slides are prepared out of doors. Finally, the prior method required scraping of the slide to prevent the coating from flaking off the slide at the handling and labeling areas. Thus, an unsteady hand or unexpected shift of the slide under the pressure of scraping could result in ruined slides.

The smoker apparatus and method of this invention has overcome these prior art disadvantages in that there is no need for holding burning magnesium, wearing welding goggles or scraping and trimming of the coating on the slide. Microscope slides prepared by the instant smoker device have a uniform coating, regardless of the wind conditions under which the slide is prepared.

SUMMARY OF THE INVENTION

A smoker device for use in a process for providing a layer of reactant magnesium oxide smoke or a microscope slide comprising a tubular base section having a flat upper surface with a rectangular aperture therein for receiving a microscope slide, fixture means mounted on said base at opposite ends of the aperture, for holding, aligning and masking a microscope slide, slide rail means mounted on the bottom surface of said base section for holding a burner screen and a removable hollow chimney tube section for holding a burner screen and a removable hollow chimney tube section which is mounted on the top surface of the base section. A method for preparing a magnesium oxide smoked microscope slide through use of a slide smoker device.

It is the principal object of this invention to provide a smoker device for safely depositing a uniform coating of magnesium oxide on a glass microscope slide under all wind conditions.

It is another object of this invention to provide a smoker device for depositing magnesium oxide on a microscope slide without the hazards of burns or eye damage associated wih the intense light and heat given off by burning magnesium ribbons.

It is a further object of this invention to provide a rapid method for uniformly coating microscope slides with magnesium oxide without the need for trimming or scraping of the slides to prevent flaking at handling and labeling areas.

It is a still further object of this invention to provide a simple, effective method for preparing uniform magnesium oxide smoked microscope slides for use in a method for measuring airborne droplets.

These and other objects of the instant invention will be apparent from the following description of the invention.

Figure 1:
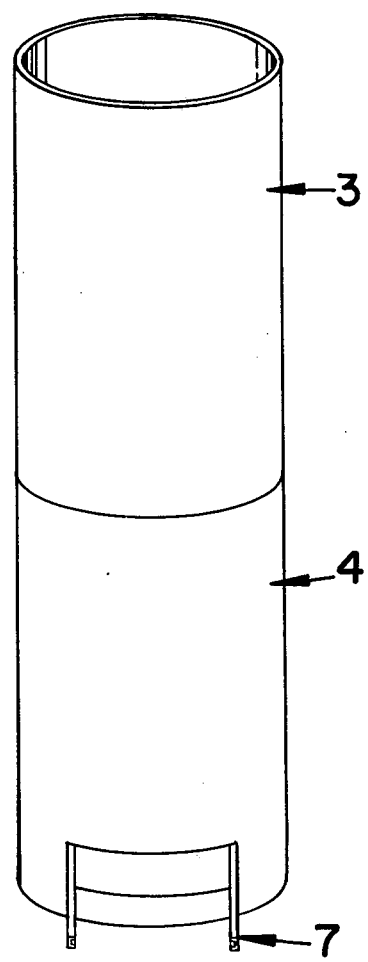
FIG. 1 is a side view showing the entire smoker apparatus of this invention.
Figure 2:
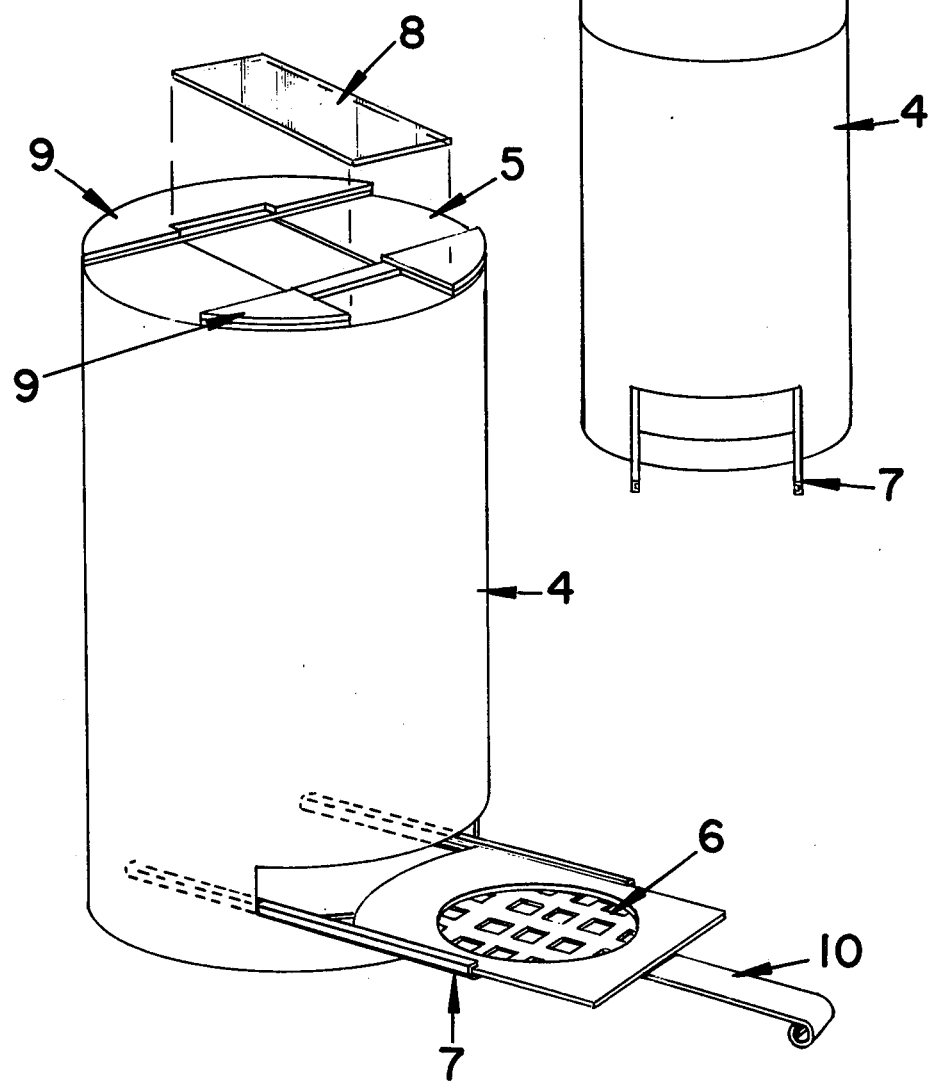
FIG. 2 is a prospective view of base section of the smoker apparatus of FIG. 1.

The smoker apparatus of the instant invention, as shown in FIGS. 1 and 2, is comprised of a hollow tubular chimney section 3 which is placed upon the top of a tubular base section 4 during operation. The base section has a flat upper surface 5 containing a rectangular aperture substantially corresponding in size to a conventional microscope slide 8. A clean microscope slide 8 is placed over the aperture and held in alignment by means of holder fixtures 9 which are mounted at opposite ends of the aperture. The holder fixtures 9 serve to hold the slide in alignment during the smoking operation while limiting the amount of smoke escaping around the edges of the slide. At the lower circumferential surface of the base section 4 at a point near the lower surface of said base section, there is provided an aperture means fitted with slide rails 7 for slidably receiving a burner screen 6 mounted on a burner screen holder 10.

In the preferred design, the slide smoker is constructed of 1/16 inch (1.59 mm) mild steel and consists of two 4 inch (10.2 cm) diameter tubes, 6 inches (15.2 cm) high. The base tube 4 has a upper surface 5 containing a rectangular hole cut to an approximate dimension of 1 inch×2 inches (2.54 cm×5.08 cm), corresponding to the approximate dimensions of a conventional microscope slide 8. The holder fixtures 9 comprise two pairs of curvilinear mated plates having a plano-convex configuration wherein the planar surfaces of each pair of mated plates is aligned adjacent to the shorter edges of the rectangular aperture. One pair of mated plates have an elongated notch on the center portion of the upper plate at the planar, i.e., straight surface and the other pair having an elongated notch on the central portion of the lower plate at the convex, i.e., curvilinear surface and the upper mated plate consisting of two curvilinear sections with configurations which correspond to the curvilinear end segments of the lower plate. The central rectilinear section defined by the planar surface and horizontal surface of the notch on the lower plate serves as a fulcrum for pivotly mounting and removing microscope slides which are placed thereon during operation of the smoker. The mated upper and lower plates of the holder fixtures 9 are mounted to the flat top 5 of the base 4 to provide a one metal thickness, e.g., 1/16 in. (0.159 cm) separation between the microscope slide surface 8 and the top 5 of the base section. The fixtures 9 are thus designed to provide a close fit between the microscope slide 8 and the base 4 and yet allow smoke to come around the edges of the slide while leaving a "masked," i.e., nonsmoked portion on the ends of the slide.

OPERATION OF THE SLIDE SMOKER

In operation, the hollow chimney section 3 is removed from the base section 4 and a clear microscope slide 8 is placed into the holding fixtures 9 over the rectangular aperture in the upper surface 5. The chimney section is then replaced on the top of the base. A length of magnesium ribbon, e.g., approximately 10 inches (25.4 cm) is rolled into a circular configuration (approximately ¾ inch–1.91 cm diameter ) and centered on the burner screen 6. The burner screen holder 10 is inserted into the slide rails 7 and the magnesium ribbon is lighted with a torch. At the first sign ignition, the screen holder is inserted all the way into the base section 4. After all smoke generation has ceased, the chimney is removed, the magnesium oxide coated slides are removed and placed in a slide holder to prevent accidental flaking and the burner screen holder is removed to discard the residue ash.

The particular length of magnesium ribbon used in the smoker apparatus of this invention is solely dependent upon the desired thickness of magnesium oxide coating on the microscope slide and can be varied within the skill of one in the art. The specific dimensions and construction of the smoker can be varied within accepted design limits provided that the burning magnesium ribbon and microscope slide are maintained within a sufficient degree of proximity to allow deposition of the magnesium oxide smoke on said slide.

The distance between the microscope slide and the burning magnesium ribbon is not critical and can be varied to achieve an optimum smoke layer on the slide. It has been found, however, that as the burning ribbon is brought closer to the slide, a more uneven layer of smoke is deposited on the slide. Conversely, as the ribbon is moved further from the slide, a great amount of magnesium is required to achieve the desired thickness of smoke on the slide. The design of the holder fixtures for the microscope slide is also not critical and can be varied to include any appropriate clamp or retaining means which will hold the slide in alignment over the aperture in the upper surface of the smoker base.

The slide smoker of this invention can readily be used for depositing any desired smoke coating on a microscope slide without danger of burns, fire, or eye damage to the operator.

The enclosed slide smoker system of this invention is a simple, portable means for preparing uniformly coated slides with significant reductions in processing time and amounts of magnesium required to provide the desired coating thickness. The use of the smoker of this invention has also eliminated the need for trimming, i.e., scraping of the coated slides for purposes of handling and labelling, since the holder fixtures serve to "mask" the ends of the slides during smoking of the slide.

The microscope slide smoker of this invention has succeeded in providing a magnesium oxide smoked microscope slide with smaller amounts of magnesium ribbon while providing a coating within one quarter to one-half the time ordinarily required to prepare slides by hand.

The magnesium oxide smoked slides prepared by the smoker device of this invention are used to detect and measure airborne droplets through microscopically measuring the permanent impression made by the droplets when they strike the layer of magnesium oxide on the smoked slide. An essential feature of the present method of measuring airborne particles is that the magnesium oxide layer be at least as thick as the diameter of the droplet to be measured and preferably about twice as thick. If, however, the layer is too thick, it is inconveniently fragile and easily flakes off the slide. The novel smoker apparatus of this invention has succeeded in consistently providing a uniform smoke layer of necessary thickness for use in measuring airborne droplets.

Applicant, having described his invention, obvious modification will become apparent to those skilled in the related chemical arts and therefore desires to be limited only by the scope of the appended claims.

I claim:

1. A smoker device for providing a layer of magnesium oxide smoke on a microscope slide comprising a tubular base section having a flat upper surface with an aperture therein for receiving a microscope slide, fixture means mounted on said upper surface for holding and aligning a slide over said aperture, means for holding a burning magnesium ribbon within the base section at a point below said aperture, wherein the means for holding the burning magnesium ribbon comprises in combination slide rail means mounted within an aperture on the lower circumferential surface of the base section for slidably receiving a burner screen holder and a burner screen holder having a burner screen mounted thereon for supporting the said burning magnesium ribbon, and a detachable hollow tubular chimney section which is fittedly mounted on the upper surface of said base section.

2. The smoker device of claim 1 wherein the fixture means for holding the slide consisting essentially of mated curvilinear plate sections having a substantially plano-convex configuration mounted on opposite ends of the rectangular apertures which are fitted to partially overlap the ends of the slide and thereby mask the slide ends from magnesium oxide smoke generating by burning magnesium ribbon within the smoker device.

3. The smoker device of claim 1 wherein the base section and chimney section are constructed of two 1/16 inch (1.59 mm) mild steel tubes having a diameter of 4 inch (10.16 cm) and a height of 6 inches (15.24 cm).

4. The smoker device of claim 3 wherein the rectangular aperture in the upper surface of the base section is approximately 1 inch (2.54 cm)×2 inch (5.08 cm).

* * * * *